(12) United States Patent
Shin et al.

(10) Patent No.: US 8,199,384 B2
(45) Date of Patent: Jun. 12, 2012

(54) METHOD OF COMPENSATING THE COLOR TONE DIFFERENCES BETWEEN TWO IMAGES OF THE SAME SCENE

(75) Inventors: Jaewon Shin, Santa Clara, CA (US); Mohammad Gharavi-Alkhansari, Santa Clara, CA (US); Ali Tabatabai, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 847 days.

(21) Appl. No.: 11/811,717

(22) Filed: Jun. 11, 2007

(65) Prior Publication Data

US 2008/0304087 A1 Dec. 11, 2008

(51) Int. Cl.
*G03F 3/08* (2006.01)

(52) U.S. Cl. .......... 358/518; 358/1.9; 358/1.6; 358/504; 358/520; 382/162; 382/167; 382/254; 345/589; 345/597; 345/600; 345/601

(58) Field of Classification Search .................... None
See application file for complete search history.

(56) References Cited

U.S. PATENT DOCUMENTS

| | | | |
|---|---|---|---|
| 5,485,553 A * | 1/1996 | Kovalick et al. ............... 358/1.6 |
| 6,256,111 B1 * | 7/2001 | Rijavec ......................... 358/1.9 |
| 6,594,388 B1 | 7/2003 | Gindele et al. |
| 7,068,396 B1 | 6/2006 | Gallagher et al. |
| 2003/0046019 A1 * | 3/2003 | Kumada et al. ............... 702/127 |
| 2003/0169818 A1 * | 9/2003 | Obrador ................... 375/240.21 |
| 2004/0071367 A1 * | 4/2004 | Irani et al. ..................... 382/284 |
| 2004/0080639 A1 * | 4/2004 | Ishiga ........................... 348/272 |
| 2004/0252345 A1 * | 12/2004 | Uekusa et al. ................. 358/2.1 |
| 2005/0074179 A1 | 4/2005 | Wilensky |
| 2005/0180657 A1 * | 8/2005 | Zhang et al. .................. 382/294 |
| 2006/0126133 A1 * | 6/2006 | Marquez ........................ 358/504 |
| 2007/0008318 A1 * | 1/2007 | Matsumoto .................... 345/424 |

* cited by examiner

*Primary Examiner* — Marivelisse Santiago Cordero
*Assistant Examiner* — Miya J Cato
(74) *Attorney, Agent, or Firm* — Haverstock & Owens LLP

(57) ABSTRACT

The color tone compensation method provides a simple and efficient method to compensate the color tone differences between two different sources of images. A first image sample, such as a still image, from a first image capturing source and a second image sample, such as a video frame, from a second image capturing source are aligned, and a tone-mapping estimation routine is applied to the two aligned images. The tone-mapping estimation routine uses the pixel intensity value histograms associated with the two aligned images and generates a tone mapping table. The tone mapping table includes a conversion intensity value for each intensity value in the second image. The conversion intensity value is a statistical measure, such as the mean, calculated according to the data in the corresponding pixel intensity value histogram. The tone-mapping table is applied to any image generated by the second image capturing source, thereby generating a new image with similar color tone as the first image generated by the first image capturing source.

49 Claims, 5 Drawing Sheets

METHOD OF COMPENSATING THE COLOR TONE DIFFERENCES BETWEEN TWO IMAGES OF THE SAME SCENE

FIELD OF THE INVENTION

The present invention relates to the field of imaging. More particularly, the present invention relates to a method for compensating the color tone differences between two images of the same scene.

BACKGROUND OF THE INVENTION

Many different types of image capturing devices are available to capture images, such as still images or video. Some image capturing devices include a single image capturing source, such as a still image camera. Other image capturing devices include multiple image capturing sources. For example, many camcorders support both still pictures and videos, and users can press the shutter while shooting a video or can enable a special mode which records the regular frame-rate video and slower frame-rate still pictures. A stereo camera, or any multi-camera system, which is used to extract and reconstruct three-dimensional information from a pair of images, is another good example of a multiple image capturing source device.

Each image capturing source generates an image with color tone characteristics specific to the image capturing source. Differences in color tone characteristics between two different image capturing sources are particularly noticeable in comparing images captured of the same scene. The color tone differences exist between the two image capturing sources due to different reasons. For some applications, the color tone differences are intentionally introduced. For example, in some camcorders, the still pictures and the videos, once captured by a CMOS sensor, go through the different processing routines optimized for the characteristics of each to enhance the quality of the videos and the still pictures. When users want to print out a frame from the video, however, it is important to convert the color tones of the video into those similar to the still images. For other applications, the differences are unintentional since even the same CMOS image sensors produce a slightly different image due to the less-than-perfect manufacturing process or lighting condition. For a stereo camera or multi-sensor systems, the resulting images would have some color tone differences, and it is desirable to reduce them as much as possible. Therefore, the need for reducing the color tone differences from different image capturing sources is demanded in many applications.

SUMMARY OF THE INVENTION

The color tone compensation method provides a simple and efficient method to compensate the color tone differences between two different sources of images. A first image sample, such as a still image, from a first image capturing source and a second image sample, such as a video frame, from a second image capturing source are aligned, and a tone-mapping estimation routine is applied to the two aligned images. The tone-mapping estimation routine uses the pixel intensity value histograms associated with the two aligned images and generates a tone mapping table. The tone mapping table includes a conversion intensity value for each intensity value in the second image. The conversion intensity value is a statistical measure, such as the mean, calculated according to the data in the corresponding pixel intensity value histogram. The tone-mapping table is applied to any image generated by the second image capturing source, thereby generating a new image with similar color tone as the first image generated by the first image capturing source.

In one aspect, a method of compensating for color tone differences between two images is disclosed. The includes receiving a first image of a scene and a second image of the scene, wherein the first image is generated by a first source and the second image is generated by a second source, determining an intensity value for each pixel in the first image and for each pixel in the second image, aligning each pixel in the second image to a pixel in the first image, for each specific intensity value in the second image, establishing a relationship between the specific intensity value in the second image and a corresponding range of intensity values in the first image, determining a conversion intensity value for each specific intensity value in the second image according to a statistical measure of the corresponding range of intensity values in the first image, generating a tone-mapping table according to the conversion intensity values such that each intensity value in the second image is associated with a specific conversion intensity value, and applying the tone-mapping table to one or more images generated by the second source, thereby forming one or more third images. Applying the tone-mapping table can include determining an intensity value for each pixel in the one or more images, determining the conversion intensity value for each intensity value in the one or more images according to the tone-mapping table, and applying the conversion intensity value to each pixel in the one or more images. Establishing the relationship between the specific intensity value in the second image and the corresponding range of intensity values in the first image can include determining a specific set of pixels in the second image that correspond to the specific intensity level, and determining a specific set of pixels in the first image that match the specific set of pixels in the second image, wherein the matching specific set of pixels in the first image include the range of intensity values corresponding to the specific set of pixels in the first image. The first source and the second source can be configured within an integrated device. The first image can be generated in a first color space and the second image is generated in a second color space different than the first color space. The first image and the second image can be generated at the same time. The first image and the second image can be generated at different times. In some embodiments, the first image can be a still image and the second image can be a video frame. In this case, aligning each pixel includes up-sampling the video frame such that a number of pixels in the video frame matches a number of pixels in the still image. In some embodiments, the first image can be a video frame and the second image can be a still image. In this case, aligning each pixel up-sampling the video frame such that a number of pixels in the video frame matches a number of pixels in the still image. In some embodiments, the first image can be a first still image and the second image can be a second still image. In some embodiments, can be a first video frame and the second image can be a second video frame. The statistical measure can be the mean of the range of intensity values in the first image. The statistical measure can be the average of the range of intensity values in the first image. The method can include generating the tone-mapping table for each color component in the second image.

In another aspect, another method of compensating for color tone differences between two images is disclosed. The method includes receiving a first image of a scene and a second image of the scene, wherein the first image is generated by a first source and the second image is generated by a second source, determining an intensity value for each pixel in the first image and for each pixel in the second image, aligning each pixel in the second image to a pixel in the first image, for each specific intensity value in the second image, determining a specific set of pixels in the second image that correspond to the specific intensity level, and determining a specific set of pixels in the first image that match the specific set of pixels in the second image, wherein the matching specific set of pixels in the first image include a corresponding range of intensity values, thereby establishing a relationship between the specific intensity value in the second image and the corresponding range of intensity values in the first image, determining a conversion intensity value for each specific intensity value in the second image according to a statistical measure of the corresponding range of intensity values in the first image, generating a tone-mapping table according to the conversion intensity values such that each intensity value in the second image is associated with a specific conversion intensity value, and applying the tone-mapping table to one or more images generated by the second source, thereby forming one or more third images. Applying the tone-mapping table can include determining an intensity value for each pixel in the one or more images, determining the conversion intensity value for each intensity value in the one or more images according to the tone-mapping table, and applying the conversion intensity value to each pixel in the one or more images. The first source and the second source can be configured within an integrated device. The first image can be generated in a first color space and the second image can be generated in a second color space different than the first color space. The first image and the second image can be generated at the same time. The first image and the second image can be generated at different times. In some embodiments, the first image can be a still image and the second image can be a video frame. In this case, aligning each pixel can include up-sampling the video frame such that a number of pixels in the video frame matches a number of pixels in the still image. In some embodiments, the first image can be a video frame and the second image can be a still image. In this case, aligning each pixel can include up-sampling the video frame such that a number of pixels in the video frame matches a number of pixels in the still image. In some embodiments, the first image can be a first still image and the second image can be a second still image. In some embodiments, the first image can be a first video frame and the second image can be a second video frame. The statistical measure can be the mean of the range of intensity values in the first image. The statistical measure can be the average of the range of intensity values in the first image. The method can also include generating the tone-mapping table for each color component in the second image.

In yet another aspect, another method of compensating for color tone differences between two images is disclosed. The method includes receiving a first image of a scene and a second image of the scene, wherein the first image is generated by a first source and the second image is generated by a second source, aligning groups of pixels in the second image to groups of pixels in the first image, determining an intensity value for each pixel group in the first image and for each pixel group in the second image, for each specific intensity value in the second image, establishing a relationship between the specific intensity value in the second image and a corresponding range of intensity values in the first image, determining a conversion intensity value for each specific intensity value in the second image according to a statistical measure of the corresponding range of intensity values in the first image, generating a tone-mapping table according to the conversion intensity values such that each intensity value in the second image is associated with a specific conversion intensity value, and applying the tone-mapping table to one or more images generated by the second source, thereby forming one or more third images. Applying the tone-mapping table can include determining an intensity value for each pixel group in the one or more images, determining the conversion intensity value for each intensity value in the one or more images according to the tone-mapping table, and applying the conversion intensity value to each pixel group in the one or more images. Establishing the relationship between the specific intensity value in the second image and the corresponding range of intensity values in the first image can include determining a specific set of pixel groups in the second image that correspond to the specific intensity level, and determining a specific set of pixel groups in the first image that match the specific set of pixel groups in the second image, wherein the matching specific set of pixel groups in the first image include the range of intensity values corresponding to the specific set of pixel groups in the first image. The first source and the second source can be configured within an integrated device. The first image can be generated in a first color space and the second image can be generated in a second color space different than the first color space. The first image and the second image can be generated at the same time. The first image and the second image can be generated at different times. In some embodiments, the first image can be a still image and the second image can be a video frame. In this case, aligning each pixel can include up-sampling the video frame such that a number of pixel groups in the video frame matches a number of pixel groups in the still image. In some embodiments, the first image can be a video frame and the second image can be a still image. In this case, aligning each pixel can include up-sampling the video frame such that a number of pixel groups in the video frame matches a number of pixel groups in the still image. In some embodiments, the first image can be a first still image and the second image can be a second still image. In some embodiments, the first image can be a first video frame and the second image can be a second video frame. The statistical measure can be the mean of the range of intensity values in the first image. The statistical measure can be the average of the range of intensity values in the first image. The method can also include generating the tone-mapping table for each color component in the second image.

In another aspect, an apparatus for compensating for color tone differences between two images is disclosed. The apparatus includes an application, a processor configured for executing the application, and a memory coupled to the processor, the memory configured for temporarily storing data for execution by the processor. The application is configured for receiving a first image of a scene and a second image of the scene, wherein the first image is generated by a first source and the second image is generated by a second source, determining an intensity value for each pixel in the first image and for each pixel in the second image, aligning each pixel in the second image to a pixel in the first image, for each specific intensity value in the second image, establishing a relationship between the specific intensity value in the second image and a corresponding range of intensity values in the first image, determining a conversion intensity value for each specific intensity value in the second image according to a statistical measure of the corresponding range of intensity values in the first image, generating a tone-mapping table according to the conversion intensity values such that each intensity value in the second image is associated with a specific conversion intensity value, and applying the tone-mapping table to one or more images generated by the second source, thereby forming one or more third images.

BRIEF DESCRIPTION OF THE DRAWINGS

Embodiments of the color tone compensation method are described relative to the several views of the drawings. Where appropriate and only where identical elements are disclosed and shown in more than one drawing, the same reference numeral will be used to represent such identical elements.

DETAILED DESCRIPTION OF THE EMBODIMENTS

Figure 1:
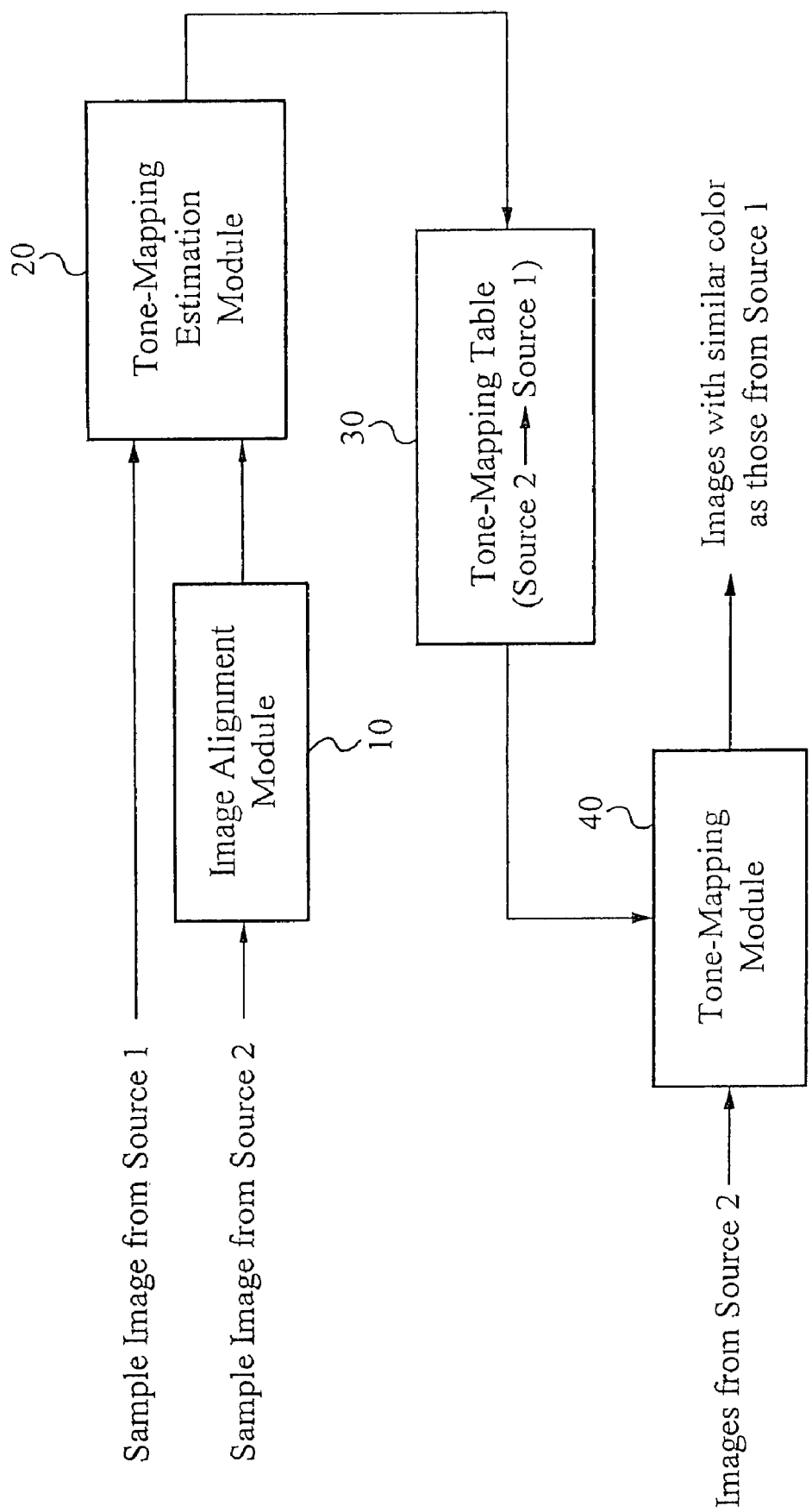
FIG. 1 illustrates an overview functional block diagram of the color-tone compensation method.

FIG. 1 illustrates an overview functional block diagram of the color-tone compensation method. The color tone compensation method applies color tone characteristics of a first source, referred to as source 1, to images generated by a second source, referred to as source 2. Each of the source 1 and the source 2 use different color spaces. In some embodiments, each of the source 1 and the source 2 also use different resolutions. Using the color tone compensation method, new images are generated based on those images generated by the second source, but with similar color tone characteristics as the images generated by the first source.

Source 1 and source 2 each generate integer intensity values. In some embodiments, the integer intensity values are in the range [0, 255] for all color components. It is understood that other ranges can be used. For simplicity, the color tone compensation method will be described in terms of transforming the color tones of source 2 images into those similar to source 1 images, although the reverse can also be performed. A tone-mapping table 30 is generated to transform the color tones of source images to similar color tones of source 1 images.

To generate the tone mapping table 30, a sample image from source 1 and a sample image from source 2 are compared using a tone-mapping estimation module 20. The sample image from source 1 and the sample image from source 2 are images of the same scene. In some embodiments, the two images are taken at the same moment of time. Alternatively, the two images are taken at different moments of time. A first step is to align the two sample images, which establishes rough pixel-wise one-to-one relationship of the two sample images. Typically, an up-sampling or image warping routine is used for the alignment. The alignment is performed by an image alignment module 10. In the case where the source 2 generates lower resolution images than the source 1, the image alignment is performed on the source 2 sample image, as is shown in FIG. 1. However, where the source 2 generates higher resolution images than the source 1, the image alignment is performed on the source 1 images. In alternative embodiments, a down-sampling routine is used for the alignment, in which case the image alignment is performed on the sample image generated by the higher resolution source device. In other embodiments, the source 1 and the source 2 use the same resolution, in which case the image alignment is not necessary.

The two aligned sample images are provided to the tone-mapping estimation module 20. The tone-mapping estimation module 20 is configured to generate the tone-mapping table 30, which is used by a tone-mapping module 40 to convert source 2 images into images with similar color tone characteristics of the source 1 sample image. The tone-mapping module 40 includes a tone-mapping routine for performing this conversion.

The tone-mapping table 30 provides a pixel-to-pixel mapping correlation between the source 1 sample image and the aligned source 2 sample image. For example, a pixel A in the source 1 sample image corresponds to a pixel A in the aligned source 2 sample image. Each pixel in the source 1 sample image has an integer intensity value. Each pixel in the aligned source 2 sample image also has an integer intensity value. For example, the pixel A in the source 1 sample image has an intensity value 90, and the corresponding pixel A in the aligned source 2 sample image has an intensity value 100. The fact that the two different pixels A have two different intensity values is to be expected since each of the two pixels A are generated using different image capturing sources. In fact, when comparing all pixels within the aligned source 2 sample image that have a given intensity value, say intensity value 100, with all corresponding pixels in the source 1 sample image, a wide range of intensity values for the pixels in the source 1 sample image is seen. Generating the tone-mapping table 30 must account for this inconsistency.

Figure 2:
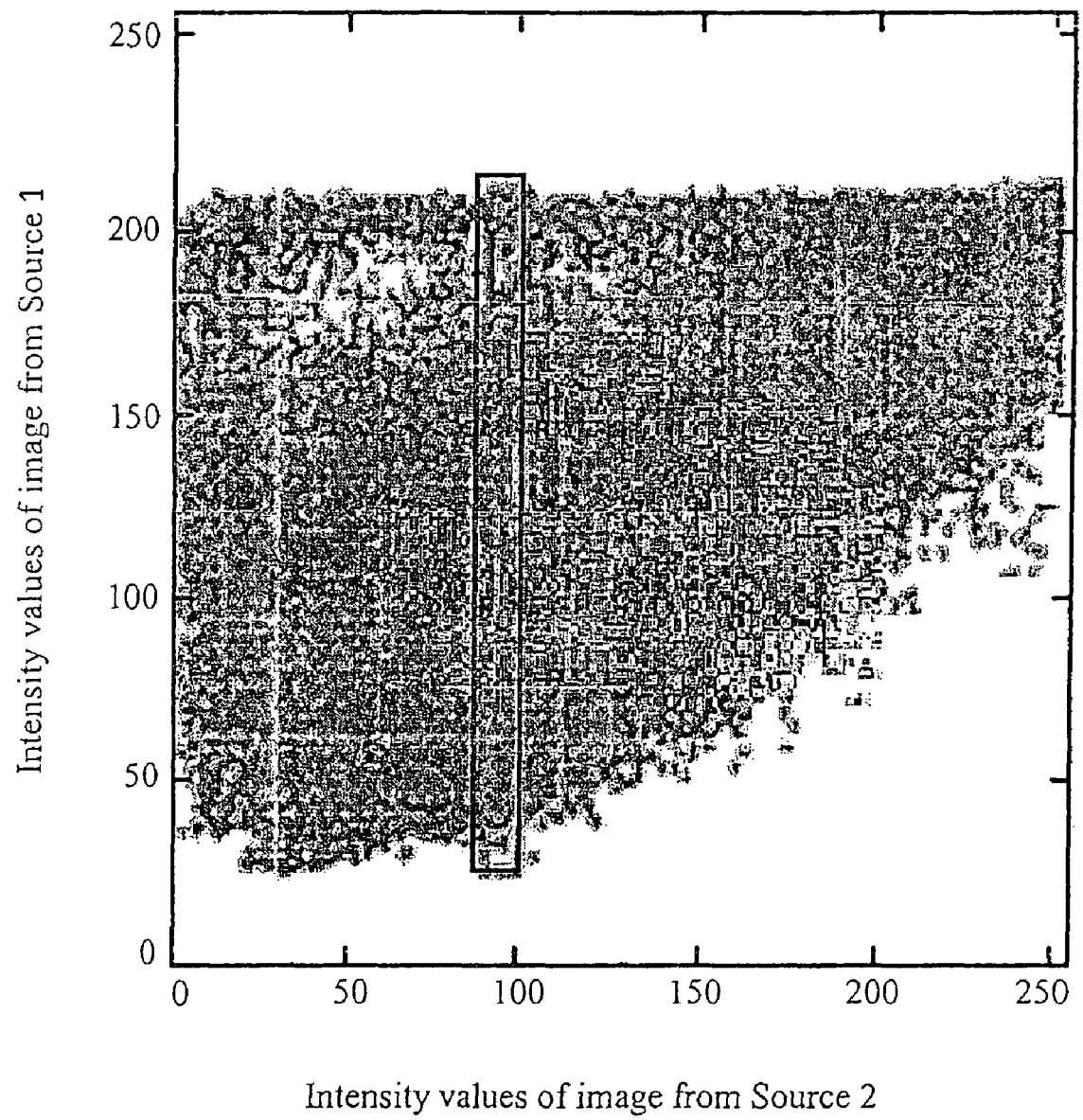
FIG. 2 illustrates an exemplary intensity value relationship between an image from source 1 and a corresponding image from source 2.

FIG. 2 illustrates an exemplary intensity value relationship between an image from source 1, such as the source 1 sample image, and a corresponding image from source 2, such as the aligned source 2 sample image. Each point in the graph of FIG. 2 represents a corresponding pixel in the source 1 sample image and the aligned source 2 sample image, such as pixel A, with an intensity value in the source 1 sample image indicated by the y-axis and an intensity value in the aligned source 2 sample image indicated by the x-axis. For all pixels in the aligned source 2 sample image with a specific intensity value, the corresponding pixels in the source 1 image may range in intensity values. For example, for all pixels in the aligned source 2 sample image with an intensity value of 100, the corresponding pixels in source 1 sample image include varying intensity values depending on the specific pixel, in this case the intensity values range from 30 to 210, as shown in FIG. 2. This means there is no unique mapping rule for tone-mapping. However, a review of the histogram for each intensity value found in the aligned source 2 sample image indicates that not all the mappings are equally likely.

Figure 3:
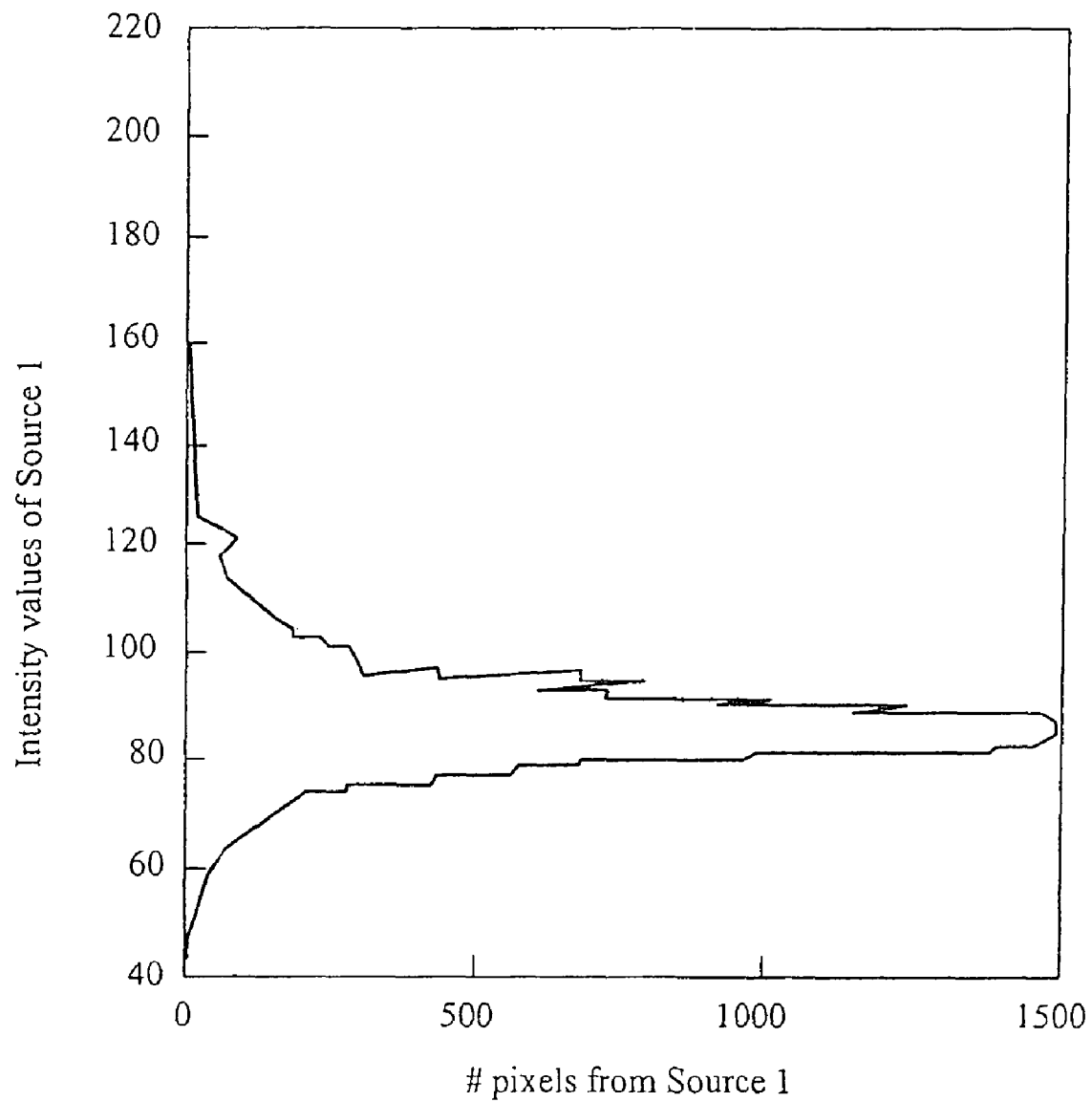
FIG. 3 illustrates a histogram using data from FIG. 1, where the histogram corresponds to an intensity value 100 of source 2.

FIG. 3 illustrates a histogram using data from FIG. 1, where the histogram corresponds to pixels in the aligned source 2 sample image with an intensity value 100. In particular, the histogram of FIG. 3 indicates a pixel intensity value distribution of all pixels in the source 1 sample image that correspond to all pixels in the aligned source 2 sample image with an intensity value 100. In this example, most of the pixels in the source 1 sample image that correspond with the intensity value 100 from the aligned source 2 sample image are mapped to the intensity value 90. Using the histogram, a specific intensity value from the aligned source 2 sample image is mapped into a "most likely" intensity value, as determined by some statistical measure. In some embodiments, the statistical measure is the mean of the intensity values from the corresponding pixels in the source 1 sample image. In other embodiments, other statistical measures, such as a medium or a weighted average, are used. The statistical measure of the source 1 pixel intensity values are used as an estimate of the mapped intensity value to be applied to the source 2 images. The statistical measure for each intensity value in the source 1 sample image is determined in this manner, thereby forming the tone-mapping table 30 (FIG. 1). A tone-mapping table is generated for each color component.

Following is a generalized procedure for computing the tone-mapping table given two aligned images. For each intensity value 'p' in the aligned source 2 sample image, find the set S(p) of all the mapped intensity values in the source 1 sample image. Compute the statistical measure E[S(p)], such as the mean, of the set S(p). In the case where the intensity values range is [0, 255], the tone mapping table is represented as [E[S(1)] E[S(2)] . . . E[S(255)]] for each color component. The tone-mapping module 40 (FIG. 1) converts a new image from the source 2 in a straightforward manner using the tone mapping table. The intensity value k in the new source 2 image is simply mapped to E[S(k)] and this is applied to all the pixels in the new source 2 image with intensity value k in a parallel, real-time conversion. Computation of the tone-mapping table needs to be done only once, when the tone-mapping table is generated from the two sample images. Subsequently, the tone-mapping table is used for converting any new images from the source 2. These converted images have similar color tones as images generated by the source 1.

Figure 4:
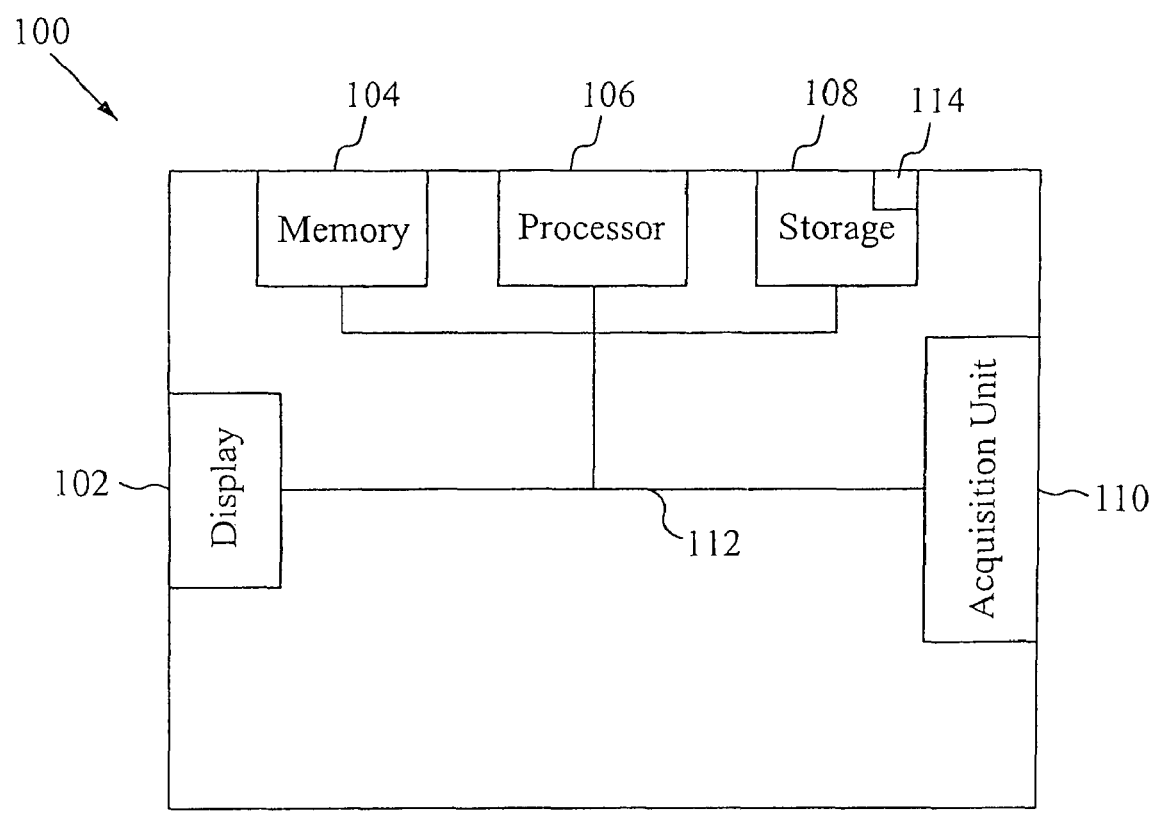
FIG. 4 illustrates a block diagram of an exemplary computing device configured to implement the color-tone compensation method.

FIG. 4 illustrates a block diagram of an exemplary computing device configured to implement the color-tone compensation method. A computing device 100 includes a display 102, a memory 104, a processor 106, a storage 108, an acquisition unit 110, and a bus 112 to couple the elements together. The acquisition unit 110 acquires image data which is then processed by the processor 106 and temporarily stored in the memory 104 and more permanently stored on the storage 108. The display 102 displays the image data acquired either during acquisition or when utilizing a display feature. When the color tone compensation method described herein is implemented in software, an application 114 resides on the storage 108, and the processor 106 processes the necessary data while the amount of the memory 104 used is minimized. When implemented in hardware, additional components are utilized to process the data, as described above. The computing device 100 is able to be, but is not limited to, a digital camcorder, a digital camera, a cellular phone, a PDA, or a computer.

Figure 5:
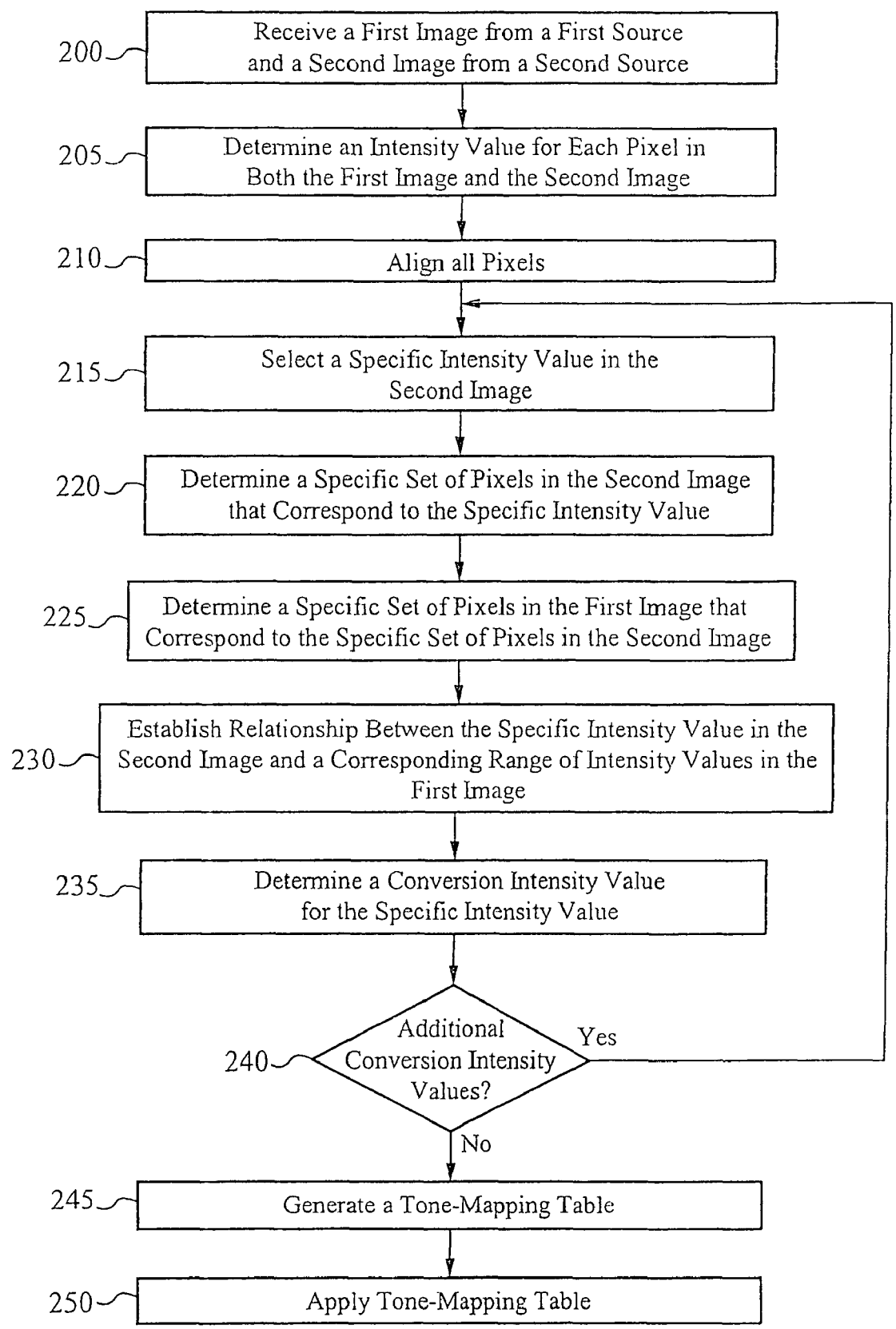
FIG. 5 illustrates an exemplary method of compensating for color-tone differences between an image generated from source 1 and a corresponding image generated from source 2.

FIG. 5 illustrates an exemplary method of compensating for color-tone differences between an image generated from a source 1 and a corresponding image generated from a source 2. At the step 200, a first image generated by a first source and a second image generated by a second source is received. In some embodiments, the first image and the second image are each of the same scene. At the step 205, an intensity value for each pixel in the first image and for each pixel in the second image is determined. At the step 210, each pixel in the second image is aligned to a pixel in the first image. In some embodiments, aligning the second image includes up-sampling the second image to a resolution of the first image. Alternatively, each of the first image and the second image have the same resolution and the alignment step is not necessary. Still alternatively, the step 205 and the step 210 can be performed in reverse order, or simultaneously. At the step 215, a specific intensity value in the second image is selected. At the step 220, a specific set of pixels in the second image that correspond to the specific intensity level selected in the step 215 is determined. At the step 225, a specific set of pixels in the first image that match the specific set of pixels in the second image is determined. In other words, for each pixel in the second image determined at the step 220, the matching pixel in the first image, as determined at the step 210, is determined. The matching set of pixels in the first image include a corresponding range of intensity values.

At the step 230, a relationship is established between the specific intensity value in the second image, as determined at the step 215, and the corresponding range of intensity values in the first image, as determined at the step 225. At the step 235, a conversion intensity value is determined for the specific intensity value in the second image. The conversion intensity value is determined according to a statistical measure of the corresponding range of intensity values in the first image. In some embodiments, the statistical measure is the mean of the intensity values included within the range of intensity values determined at the step 225. At the step 240, it is determined if additional conversion intensity values are to be determined. A conversion intensity value is to be determined for each intensity value present in the second image, as determined at the step 205. In some embodiments, the second source generates the second image according to a range of intensity values [0, 255]. In this case, a conversion intensity value is determined for each intensity value in the range [0, 255]. If it is determined at the step 240 that an additional conversion intensity value is to be determined, then the method moves to the step 215 and a new specific intensity value is selected. The new intensity value is within the range of intensity values determined at the step 205, or the range of intensity values used by the second source.

If it is determined at the step 240 that no additional conversion intensity values are to be determined, then the method moves to the step 245. At the step 245, a tone-mapping table is generated. The tone-mapping table is generated according to the conversion intensity values such that each intensity value in the second image is associated with a specific conversion intensity value. At the step 250, the tone-mapping table is applied to one or more images generated by the second source, thereby forming one or more third images with similar color tone images as the first image generated by the first source.

The color tone compensation method is described above using a pixel-to-pixel relationship between the two images for which color tone compensation is to be performed. In alternative methods, the two images are aligned such that a group of pixels-to-a group of pixels relationship is established. Although less accurate than the pixel-to-pixel relationship, the group-to-group relationship enables faster performance of the color tone compensation method.

Further, although alignment of the two images is primarily described above in terms of up-sampling the lower resolution image to the higher resolution image, any conventional method can be applied to align the two images. In this manner, the color tone compensation method can be applied to still image to still image applications, still image to video frame applications, video frame to video frame applications, and so on.

The present invention has been described in terms of specific embodiments incorporating details to facilitate the understanding of the principles of construction and operation of the invention. Such references, herein, to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A method of compensating for color tone differences between two images, the method comprising:

a. receiving a first image of a scene and a second image of the same scene, wherein the first image is generated by a first source and the second image is generated by a second source;
b. determining an intensity value for each pixel in the first image and for each pixel in the second image;
c. aligning each pixel in the second image to a pixel in the first image, wherein the aligning is done either by up-sampling or down-sampling;
d. for each specific intensity value in the second image, establishing a relationship between the specific intensity value in the second image and a corresponding range of intensity values in the first image;
e. determining a conversion intensity value for each specific intensity value in the second image according to a statistical measure of the corresponding range of intensity values in the first image;
f. generating a tone-mapping table according to the conversion intensity values such that each intensity value in the second image is associated with a specific conversion intensity value; and
g. applying the tone-mapping table to one or more images generated by the second source, thereby forming one or more third images with a tone similar to the tone of the first image.

2. The method of claim 1 wherein applying the tone-mapping table comprises:
a. determining an intensity value for each pixel in the one or more images;
b. determining the conversion intensity value for each intensity value in the one or more images according to the tone-mapping table; and
c. applying the conversion intensity value to each pixel in the one or more images.

3. The method of claim 1 wherein establishing the relationship between the specific intensity value in the second image and the corresponding range of intensity values in the first image includes determining a specific set of pixels in the second image that correspond to the specific intensity level, and determining a specific set of pixels in the first image that match the specific set of pixels in the second image, wherein the matching specific set of pixels in the first image include the range of intensity values corresponding to the specific set of pixels in the first image.

4. The method of claim 1 wherein the first source and the second source are configured within an integrated device.

5. The method of claim 1 wherein the first image is generated in a first color space and the second image is generated in a second color space different than the first color space.

6. The method of claim 1 wherein the first image and the second image are generated at the same time.

7. The method of claim 1 wherein the first image and the second image are generated at different times.

8. The method of claim 1 wherein the first image comprises a still image and the second image comprises a video frame.

9. The method of claim 8 wherein aligning each pixel comprises up-sampling the video frame such that a number of pixels in the video frame matches a number of pixels in the still image.

10. The method of claim 1 wherein the first image comprises a video frame and the second image comprises a still image.

11. The method of claim 10 wherein aligning each pixel comprises up-sampling the video frame such that a number of pixels in the video frame matches a number of pixels in the still image.

12. The method of claim 1 wherein the first image comprises a first still image and the second image comprises a second still image.

13. The method of claim 1 wherein the first image comprises a first video frame and the second image comprises a second video frame.

14. The method of claim 1 wherein the statistical measure is the mean of the range of intensity values in the first image.

15. The method of claim 1 wherein the statistical measure is the average of the range of intensity values in the first image.

16. The method of claim 1 further comprising generating the tone-mapping table for each color component in the second image.

17. A method of compensating for color tone differences between two images, the method comprising:
a. receiving a first image of a scene and a second image of the same scene, wherein the first image is generated by a first source and the second image is generated by a second source;
b. determining an intensity value for each pixel in the first image and for each pixel in the second image;
c. aligning each pixel in the second image to a pixel in the first image, wherein the aligning is done either by up-sampling or down-sampling;
d. for each specific intensity value in the second image, determining a specific set of pixels in the second image that correspond to the specific intensity level, and determining a specific set of pixels in the first image that match the specific set of pixels in the second image, wherein the matching specific set of pixels in the first image include a corresponding range of intensity values, thereby establishing a relationship between the specific intensity value in the second image and the corresponding range of intensity values in the first image;
e. determining a conversion intensity value for each specific intensity value in the second image according to a statistical measure of the corresponding range of intensity values in the first image;
f. generating a tone-mapping table according to the conversion intensity values such that each intensity value in the second image is associated with a specific conversion intensity value; and
g. applying the tone-mapping table to one or more images generated by the second source, thereby forming one or more third images with a tone similar to the tone of the first image.

18. The method of claim 17 wherein applying the tone-mapping table comprises:
a. determining an intensity value for each pixel in the one or more images;
b. determining the conversion intensity value for each intensity value in the one or more images according to the tone-mapping table; and
c. applying the conversion intensity value to each pixel in the one or more images.

19. The method of claim 17 wherein the first source and the second source are configured within an integrated device.

20. The method of claim 17 wherein the first image is generated in a first color space and the second image is generated in a second color space different than the first color space.

21. The method of claim 17 wherein the first image and the second image are generated at the same time.

22. The method of claim 17 wherein the first image and the second image are generated at different times.

23. The method of claim 17 wherein the first image comprises a still image and the second image comprises a video frame.

24. The method of claim 23 wherein aligning each pixel comprises up-sampling the video frame such that a number of pixels in the video frame matches a number of pixels in the still image.

25. The method of claim 17 wherein the first image comprises a video frame and the second image comprises a still image.

26. The method of claim 25 wherein aligning each pixel comprises up-sampling the video frame such that a number of pixels in the video frame matches a number of pixels in the still image.

27. The method of claim 17 wherein the first image comprises a first still image and the second image comprises a second still image.

28. The method of claim 17 wherein the first image comprises a first video frame and the second image comprises a second video frame.

29. The method of claim 17 wherein the statistical measure is the mean of the range of intensity values in the first image.

30. The method of claim 17 wherein the statistical measure is the average of the range of intensity values in the first image.

31. The method of claim 17 further comprising generating the tone-mapping table for each color component in the second image.

32. A method of compensating for color tone differences between two images, the method comprising:
   a. receiving a first image of a scene and a second image of the same scene, wherein the first image is generated by a first source and the second image is generated by a second source;
   b. aligning groups of pixels in the second image to groups of pixels in the first image, wherein the aligning is done either by up-sampling or down-sampling;
   c. determining an intensity value for each pixel group in the first image and for each pixel group in the second image;
   d. for each specific intensity value in the second image, establishing a relationship between the specific intensity value in the second image and a corresponding range of intensity values in the first image;
   e. determining a conversion intensity value for each specific intensity value in the second image according to a statistical measure of the corresponding range of intensity values in the first image;
   f. generating a tone-mapping table according to the conversion intensity values such that each intensity value in the second image is associated with a specific conversion intensity value; and
   g. applying the tone-mapping table to one or more images generated by the second source, thereby forming one or more third images with a tone similar to the tone of the first image.

33. The method of claim 32 wherein applying the tone-mapping table comprises:
   a. determining an intensity value for each pixel group in the one or more images;
   b. determining the conversion intensity value for each intensity value in the one or more images according to the tone-mapping table; and
   c. applying the conversion intensity value to each pixel group in the one or more images.

34. The method of claim 32 wherein establishing the relationship between the specific intensity value in the second image and the corresponding range of intensity values in the first image includes determining a specific set of pixel groups in the second image that correspond to the specific intensity level, and determining a specific set of pixel groups in the first image that match the specific set of pixel groups in the second image, wherein the matching specific set of pixel groups in the first image include the range of intensity values corresponding to the specific set of pixel groups in the first image.

35. The method of claim 32 wherein the first source and the second source are configured within an integrated device.

36. The method of claim 32 wherein the first image is generated in a first color space and the second image is generated in a second color space different than the first color space.

37. The method of claim 32 wherein the first image and the second image are generated at the same time.

38. The method of claim 32 wherein the first image and the second image are generated at different times.

39. The method of claim 32 wherein the first image comprises a still image and the second image comprises a video frame.

40. The method of claim 39 wherein aligning each pixel comprises up-sampling the video frame such that a number of pixel groups in the video frame matches a number of pixel groups in the still image.

41. The method of claim 32 wherein the first image comprises a video frame and the second image comprises a still image.

42. The method of claim 41 wherein aligning each pixel comprises up-sampling the video frame such that a number of pixel groups in the video frame matches a number of pixel groups in the still image.

43. The method of claim 32 wherein the first image comprises a first still image and the second image comprises a second still image.

44. The method of claim 32 wherein the first image comprises a first video frame and the second image comprises a second video frame.

45. The method of claim 32 wherein the statistical measure is the mean of the range of intensity values in the first image.

46. The method of claim 32 wherein the statistical measure is the average of the range of intensity values in the first image.

47. The method of claim 32 further comprising generating the tone-mapping table for each color component in the second image.

48. An apparatus for compensating for color tone differences between two images, the apparatus comprising:
   a. an application for:
      i. receiving a first image of a scene and a second image of the same scene, wherein the first image is generated by a first source and the second image is generated by a second source;
      ii. determining an intensity value for each pixel in the first image and for each pixel in the second image;
      iii. aligning each pixel in the second image to a pixel in the first image, wherein the aligning is done either by up-sampling or down-sampling;
      iv. for each specific intensity value in the second image, establishing a relationship between the specific intensity value in the second image and a corresponding range of intensity values in the first image;
      v. determining a conversion intensity value for each specific intensity value in the second image according to a statistical measure of the corresponding range of intensity values in the first image;
      vi. generating a tone-mapping table according to the conversion intensity values such that each intensity value in the second image is associated with a specific conversion intensity value; and vii. applying the tone-mapping table to one or more images generated by the second source, thereby forming one or more third images with a tone similar to the tone of the first image; and b. a processor configured for executing the application; and c. a memory coupled to the processor, the memory configured for temporarily storing data for execution by the processor.

49. A method of compensating for color tone differences between two images, the method comprising:

a. receiving a first image of a scene and a second image of the same scene, wherein the first image is generated by a first source and the second image is generated by a second source;

b. determining an intensity value for each pixel in the first image and for each pixel in the second image;

c. aligning each pixel in the second image to a pixel in the first image, wherein the aligning is done either by up-sampling or down-sampling;

d. for each specific intensity value in the second image, establishing a relationship between the specific intensity value in the second image and a corresponding range of intensity values in the first image;

e. determining a conversion intensity value for each specific intensity value in the second image according to a statistical measure of the corresponding range of intensity values in the first image;

f. generating a tone-mapping table according to the conversion intensity values such that each intensity value in the second image is associated with a specific conversion intensity value; and g. applying the tone-mapping table to one or more images generated by the second source, thereby forming one or more third images.

* * * * *